United States Patent [19]
Rieker

[11] Patent Number: 5,227,178
[45] Date of Patent: Jul. 13, 1993

[54] INDEPENDENT-STROKE EJECTION SYSTEM

[75] Inventor: Gerd T. Rieker, Troy, N.Y.
[73] Assignee: Crellin, Inc., Chatham, N.Y.
[21] Appl. No.: 872,048
[22] Filed: Apr. 22, 1992
[51] Int. Cl.⁵ ............................................ B29C 45/40
[52] U.S. Cl. ..................... 425/556; 249/68; 264/334; 425/DIG. 5
[58] Field of Search ............... 425/554, 556, DIG. 5; 264/334; 249/68

[56] References Cited
U.S. PATENT DOCUMENTS
3,893,644  7/1975  Drazick ............................. 249/68

*Primary Examiner*—Tim Heitbrink
*Attorney, Agent, or Firm*—Kane, Dalsimer, Sullivan, Kurucz, Levy, Eisele and Richard

[57] ABSTRACT

An independent-stroke ejection system for an injection molding apparatus enables the motion of an ejector pin, or pins, to be controlled independently of the motion of the knock-out plates. The so-called independent-stroke ejector pin is mounted on an independent-stroke knock-out pin retainer rod which is alternately locked to and unlocked from the reciprocating motion of the knock-out plates. As a consequence, the independent-stroke ejector pin moves only during a portion of the reciprocating cycle of the knock-out plates, and does not advance and retract over an equivalent distance. While ejector pins are usually mounted on the knock-out plates, and reciprocate over an equivalent distance, the present invention enables one to uncouple the motion of an ejector pin from the knock-out plates for a portion of the reciprocating cycle.

4 Claims, 12 Drawing Sheets

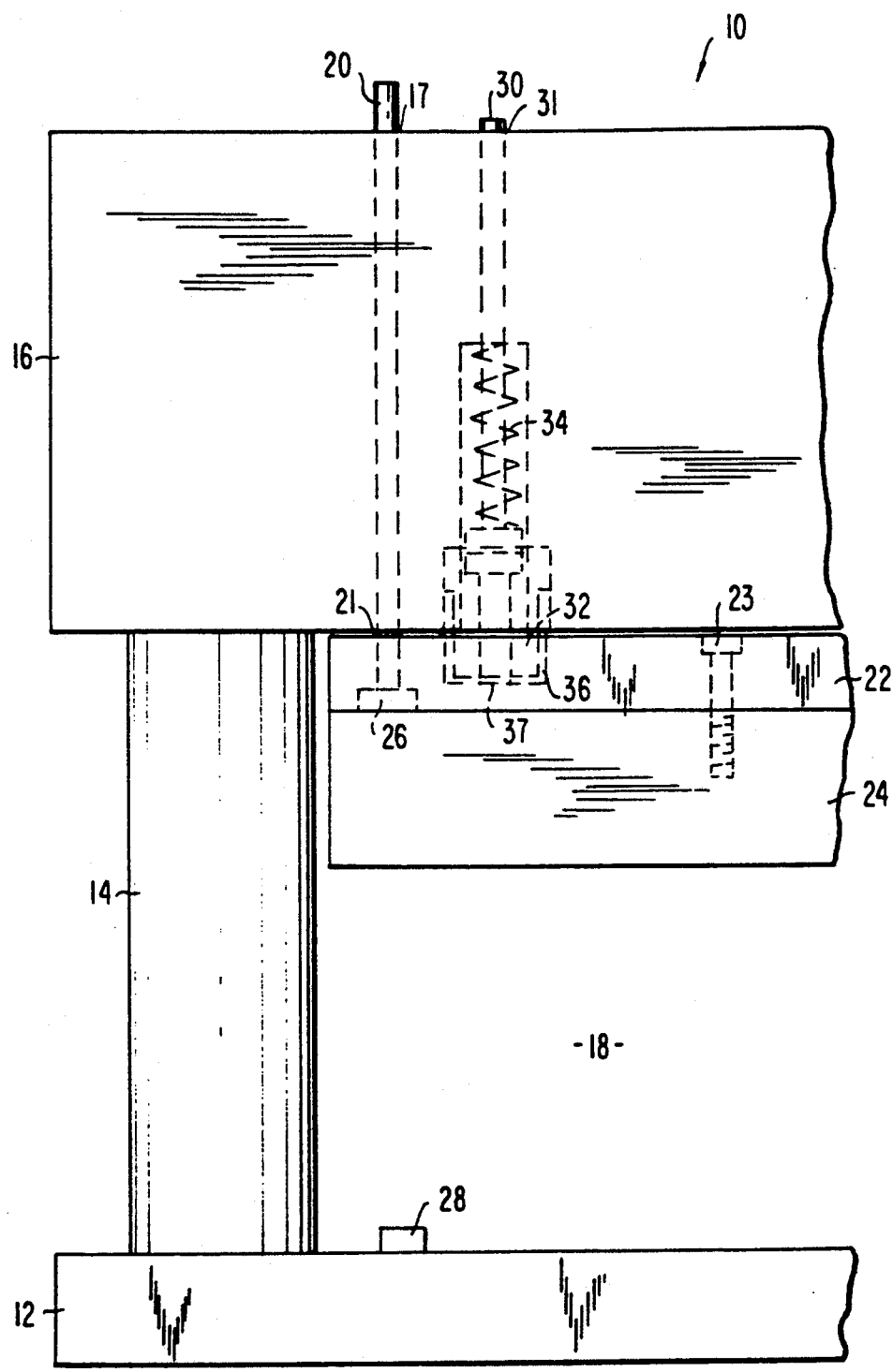
FIG. IB
PRIOR ART

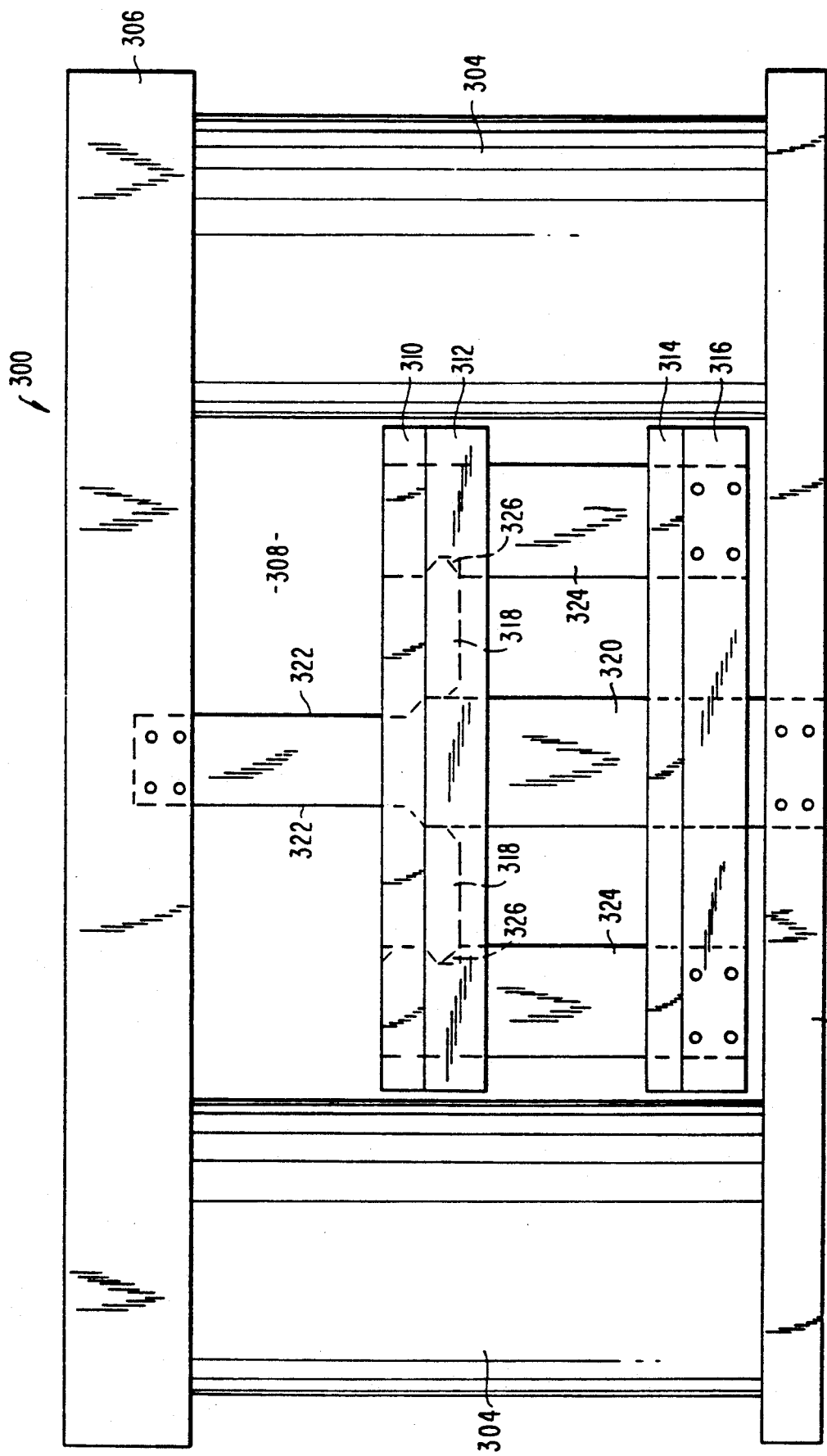

INDEPENDENT-STROKE EJECTION SYSTEM

BACKGROUND OF THE INVENTION

1. Field of the Invention

This invention relates generally to an injection molding apparatus and more particularly to an independent-stroke ejection system for use in an injection molding apparatus.

2. Description of the Prior Art

In the formation of articles by an injection molding process, plasticized material is forced under considerable pressure into a closed mold wherein the material cools and hardens. As the moveable portion of the mold is retracted after hardening of the plastic material into a molded article, the molded article is typically ejected by means of a series of ejector pins. Rapid ejection of the molded article from the core during this knock-out portion of the injection molding cycle is desirable to avoid undue adhering of the article to the core as a result of shrinkage.

When the molded article is ejected, or knocked out, of the mold, in order to clear the mold for the manufacture of a subsequent molded article, any runners not part of the molded article must also be cleared from the mold. A runner, as such is understood by those skilled in the art, is produced by a channel leading, in the mold, from the nozzle or hot manifold for the molten plastic material to the actual portion of the mold used to manufacture the article.

Several different systems have been used over the years to knock molded articles and their associated runners from molds. One such system uses a delayed knock-out pin to eject the runner. This system includes a short, spring-loaded knock-out pin for the runner, which ejects the runner after the part. This system still performs very well, but suffers from one distinct disadvantage—the runner frequently becomes lodged within the molded article.

Another system uses a long knock-out pin for the runner. The long pin knocks the runner out first, before other shorter pins knock out the entire molded article. Although the system eliminates the problem of the runner being lodged within the molded article, several other problems are introduced. In particular, at the full knock-out forward position, the molded article may be ejected out of the mold cavity onto the long knock-out pin. The article may then hang on the end of the long knock-out pin after being ejected from the mold cavity. Sometimes, the long knock-out pin drags the molded article back into the mold cavity far enough to leave the part supported therein. This situation leaves open the possibility that the mold may close onto an already molded article. A second knock-out stroke is sometimes used to eliminate this possibility.

Prior-art systems such as these have also been used where molded articles of different sizes are being molded within the same family mold. In such cases, the several molded articles may each have different draw lengths; that is to say, they may require knock-out strokes of different length. The molding of articles of different sizes in a common mold is a widely used technique in the industry, but has associated with it problems similar to those discussed above in connection with the knocking-out of runners.

Similarly, these prior-art systems have also been used to knock out shallow portions of a molded product that has both shallow-draw and deep-draw areas. This has especially been the case where there is a possibility that the knock-out pins might interfere or make contact with core pulls or other common features of a mold.

The present invention has been designed to avoid the difficulties inherent in prior-art ejector systems, while maintaining their positive aspects. The present invention also provides an alternative means for knocking molded articles of various sizes from a family mold, and for knocking out molded articles having shallow-draw and deep-draw areas.

SUMMARY OF THE INVENTION

The present invention enables one to control the motion of a knock-out, or ejector, pin, or pins, in a mold independently of that of other pins. That is to say, the motion of an ejector pin, or pins, may be alternately coupled and decoupled from that of others in the mold for a portion of the knock-out cycle. The knock-out cycle, it will be understood, is only a small part of the overall injection molding cycle, which comprises the separate stages of injection, packing, curing or freezing, mold opening, and ejection.

In the present invention, as was the case with the prior-art devices noted above, there are ejector pins whose motions are continuous over the entire knock-out cycle. Such ejector pins will alternately advance into and retract from the mold cavity, stopping momentarily only at the extreme positions of the reciprocating motion of the knock-out cycle to reverse direction of travel. As pins of this sort are connected or attached to common knock-out plates which reciprocate within the ejector box portion of the mold apparatus, their motion will match that of the knock-out plates.

The independent-stroke ejector pin, or pins, made in accordance with the present invention, are uncoupled from the knock-out plates for a portion of each knock-out cycle. In this manner, the independent-stroke ejector pin advances for part of the knock-out cycle, stops, while those ejector pins connected to the knock-out plates continue to advance to their fullest extent and begin to retract therefrom, and then fully retracts to complete the knock-out cycle. When moving, it does so at a speed equal to, and in the same direction as, that of any pins directly connected to the knock-out plates. The independent-stroke ejector pin operates in this way by being mounted on an independent-stroke knock-out pin retainer rod, rather than directly on the knock-out plates. The independent-stroke knock-out pin retainer rod is locked to, and moves with, the knock-out plates for only certain desired portions of the knock-out cycle.

With the present invention, it is technically possible to vary the motion of every ejector pin in a mold. The movement of an ejector pin, or of an entire group of pins, may be made independent of the motion of the knock-out plates, and may be started and stopped, and, if necessary, started again, at any time during the ejection stroke.

Among its advantages, the present invention provides a solution to the difficulties inherent in the prior art systems discussed above. For example, the independent-stroke ejector pin may be provided in such a length to enter the mold cavity first to knock out the runner, and then to stop advancing, while other ejector pins continue to advance to knock out the part. In this way, the runner is knocked out before the part, as was the case with the long knock-out pin system, so that the runner will not become lodged in the part. Yet, the independent-stroke ejector pin stops advancing, so that there will be no possibility that the part will be ejected from the mold only to be caught and drawn back in by a long runner pin.

As previously noted above, the present invention may be incorporated into molds used to produce articles of more than one size at a given time, or to produce molded articles having shallow-draw and deep-draw areas.

A further advantage of the present invention is that it may be readily incorporated into existing molds.

The present invention will now be described in more complete detail with frequent reference being made to the figures listed below.

BRIEF DESCRIPTION OF THE DRAWINGS

FIG. 1B represents the same view of the system shown in FIG. 1A at the other extreme position in its reciprocating motion.

FIG. 9 presents an embodiment of the present invention having two sets of knock-out pin plates, one of which is uncoupled from the other for part of the knock-out cycle.

DETAILED DESCRIPTION OF THE INVENTION

Before turning to a detailed description of the present invention, the above-mentioned prior-art ejection systems will be described hereinbelow, so that the present invention may be clearly contrasted therewith.

Figure 1A:
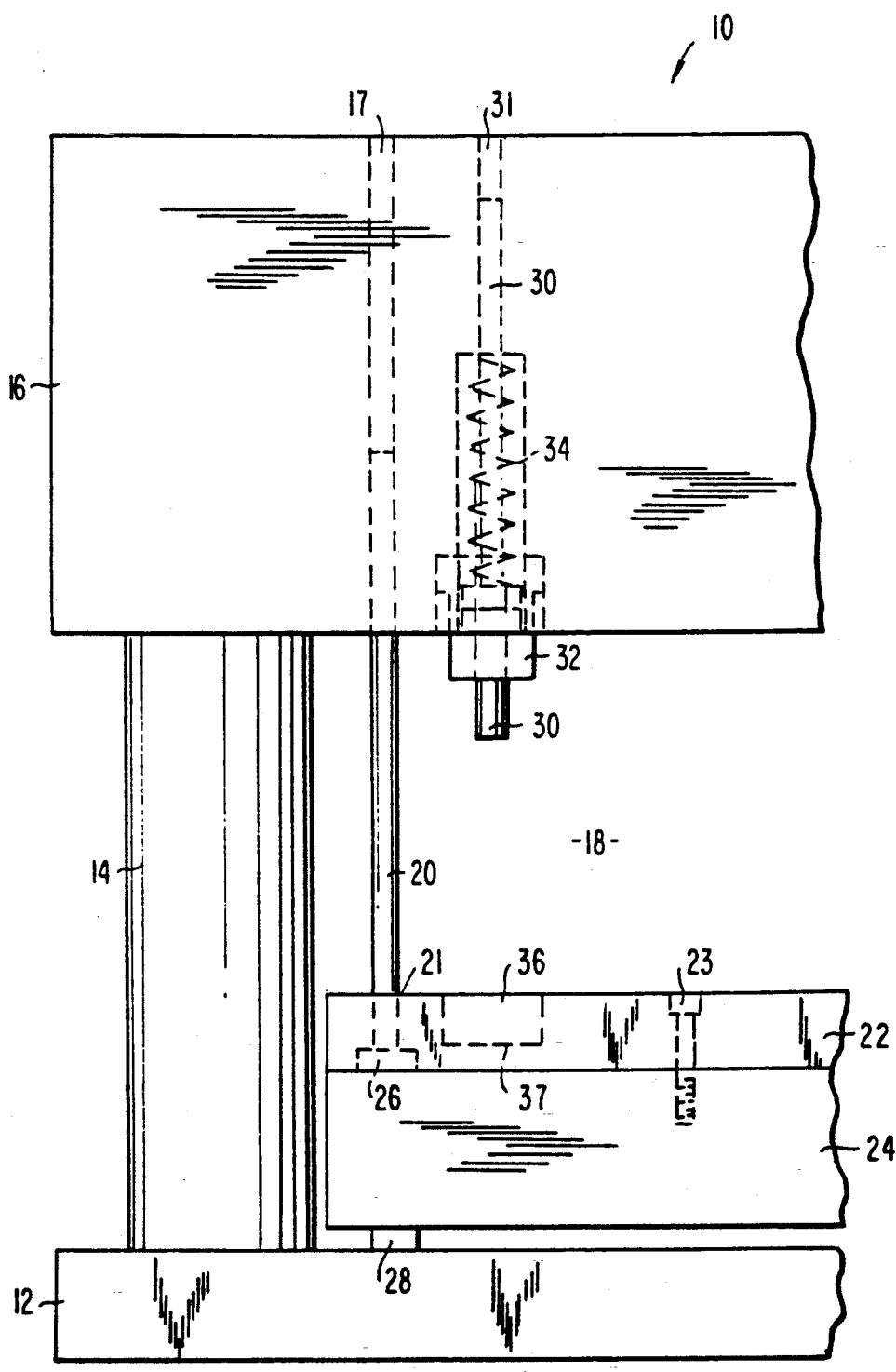
FIG. 1A is a side view in partial cross section of a prior-art delayed knock-out pin ejection system at an extreme position in its reciprocating motion.

We shall turn first to a description of a so-called delayed knock-out pin ejection system. With reference to FIG. 1A, such a system is generally identified with reference numeral 10. In FIG. 1A, the ejection system 10 is shown at that stage of its reciprocating motion wherein the ejector pins are in fully retracted positions, that is, at the lowest point in its reciprocating motion.

The system 10 includes a base plate 12, at least two side members 14 on opposite sides of the base plate 12, and a support plate 16, which together define an ejector box 18. Side members 14, which may be cylindrical in shape, also support the entire closing tonnage that is applied to the mold. The support plate 16 is so-identified because it supports one portion of a mold, not shown in any figure, used to manufacture a molded article by injection molding. Support plate 16, in practice, contains the actual molding components either recessed thereinto or standing thereabove. At least one ejector pin 20 passes through the support plate 16 in a hole 17 to participate in knocking a molded article from the mold.

The ejector pin 20 is mounted for reciprocating movement by means of a knock-out pin plate 22 and a knock-out retainer plate 24. During the assembly or modification of an ejector system, the knock-out pin plate 22 and the knock-out retainer plate 24 are separated from one another. This permits the insertion of ejector pin 20 up through a hole 21 in the knock-out pin plate 22. Ejector pin 20 has a head 26 which prevents the ejector pin 20 from slipping up out of the hole 21. When all ejector pins 20 are so inserted, the knock-out retainer plate 24 is fixedly attached to the knock-out pin plate 22 by such means as socket head cap screws 23, thereby retaining the ejector pins 20 in a desired position.

During the operation of the ejection system 10, the knock-out pin plate 22 and the knock-out retainer plate 24 reciprocate within ejector box 18, up and down as depicted in FIG. 1A, as a unit, thereby advancing and retracting the ejector pin 20 through the holes 17 in the support plate 16. The base plate 12 may be fitted with return stops 28, against which the knock-out retainer plate 24 may rest at the completion of the knock-out cycle.

The operation of the delayed knock-out pin 30 will be described by comparing FIGS. 1A and 1B, the latter of which shows ejection system 10 at the highest point of its reciprocating motion, where knock-out pin plate 22 makes its closest approach to the support plate 16. Given elements of the ejection system 10 are identified with the same reference numerals in both FIGS. 1A and 1B.

It should first be observed that the delayed knock-out pin 30 is mounted to the underside of support plate 16 in a housing 32. Within housing 32 is a spring biasing means 34 which acts to bias the delayed knock-out pin 30 toward ejector box 18, or down in FIGS. 1A and 1B. Delayed knock-out pin 30 itself may pass through support plate 16 in hole 31. In a position corresponding to that of housing 32, there is a recess 36 on the upper surface of the knock-out pin plate 22. By comparing the configurations of ejector system 10 in the two extreme positions of its reciprocating motion shown in FIGS. 1A and 1B, one may observe the operation of delayed knock-out pin ejector system 10. As the knock-out pin plate 22 and the knock-out retainer plate 24 approach the underside of support plate 16 as a unit, in so doing advancing ejector pin 20, recess 36 approaches delayed knock-out pin 30 and housing 32. Recess 36 is of a size which accommodates housing 32. The bottom 37 of recess 36 pushes delayed knock-out pin 30, while the recess 36 as a whole surrounds housing 32. For this reason, the movement of delayed knock-out pin 30 is "delayed" in comparison to that of ejector pin 20 until knock-out pin plate 22 is sufficiently close to the underside of support plate 16 for the bottom 37 of recess 36 to contact delayed knock-out pin 30. In this manner, delayed knock-out pin 30 may knock-out a runner after ejector pins 20 have knocked out the molded part. On the return stroke of knock-out pin plate 22, knock-out retainer plate 24, and ejector pin 20, spring biasing means 34 retracts the delayed knock-out pin 30.

Figure 2A:
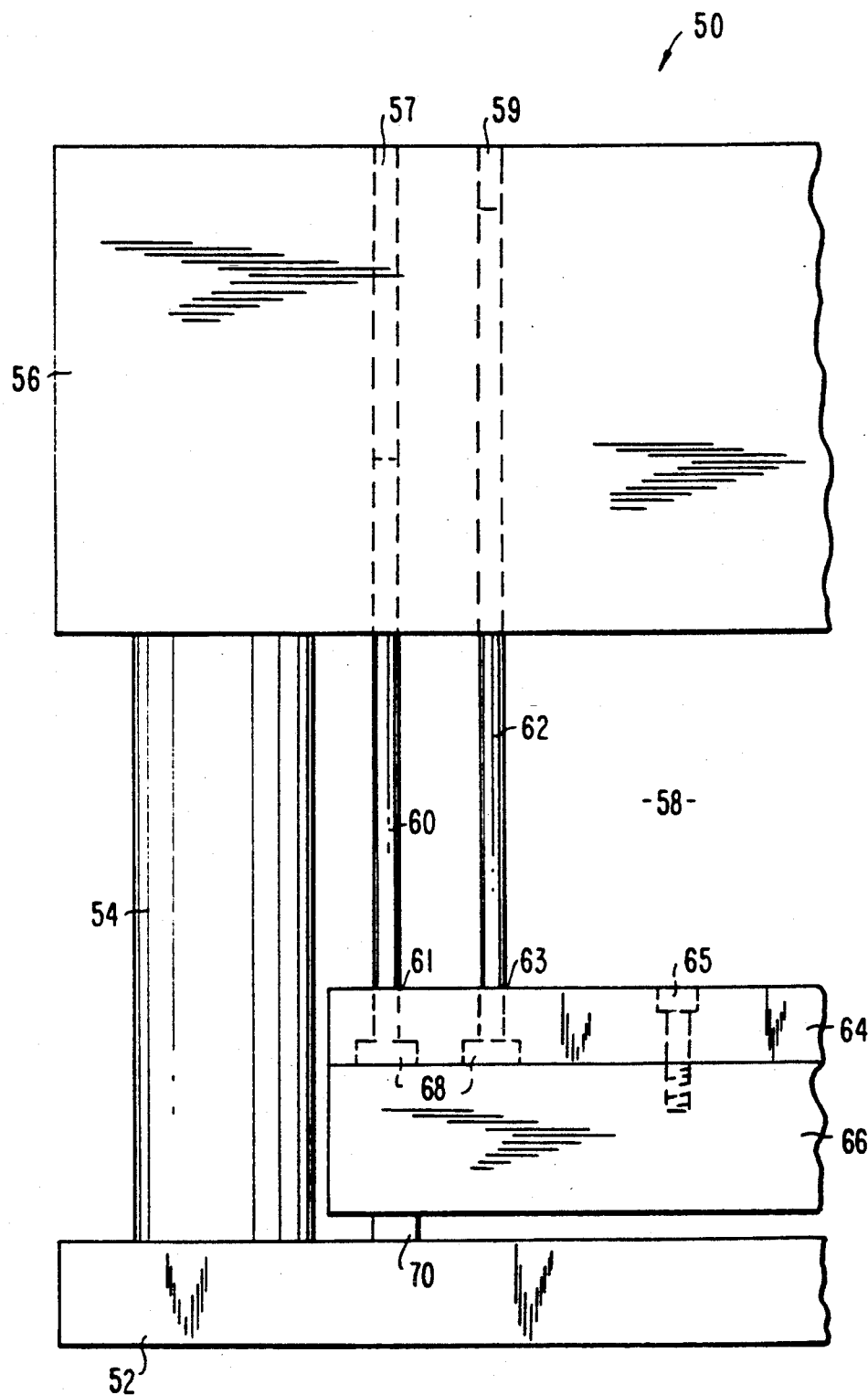
FIG. 2A presents a side view in partial cross section of another knock-out pin ejection system of the prior art at an extreme position in its reciprocating motion.
Figure 2B:
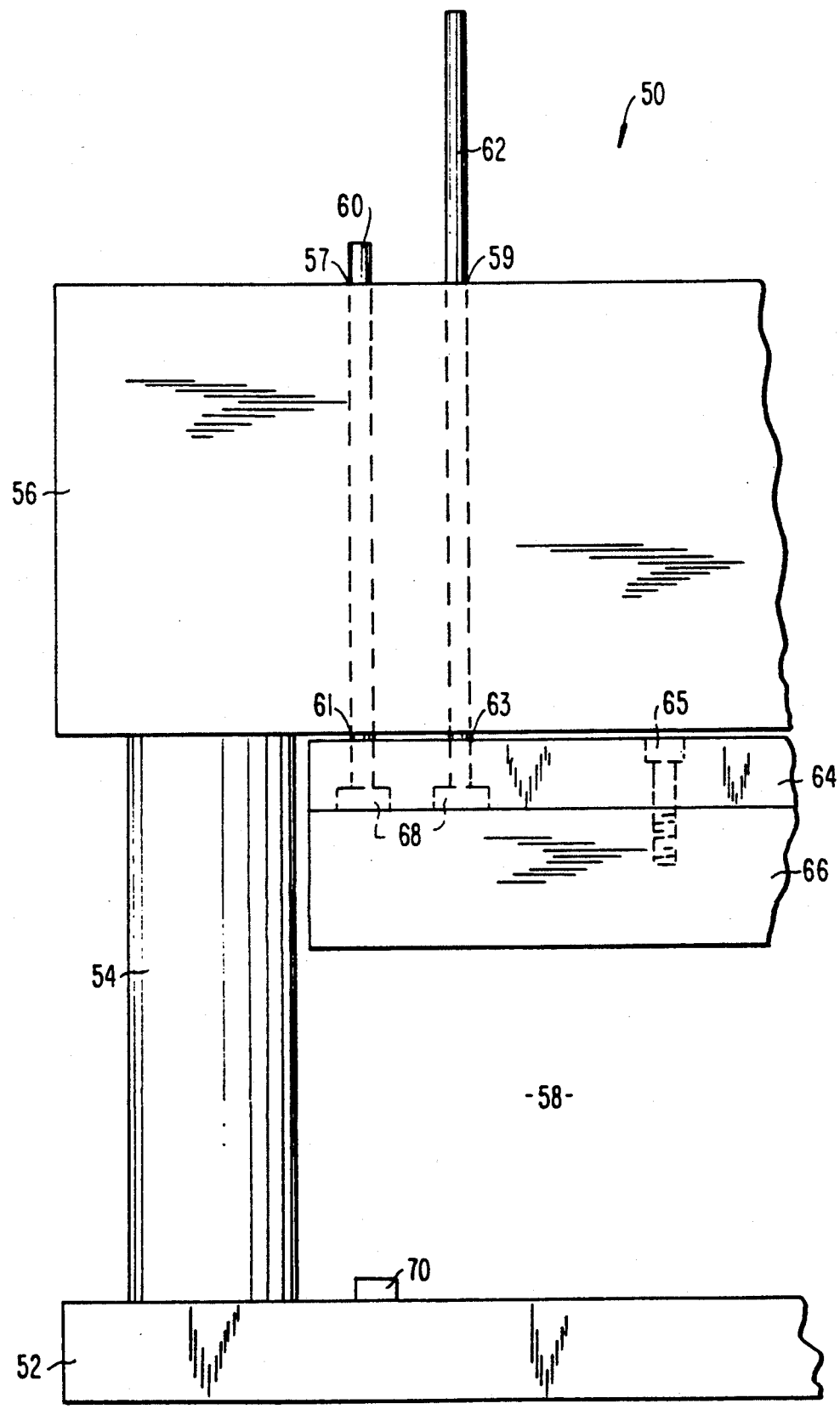
FIG. 2B presents the same view of the system shown in FIG. 2A at the other extreme position in its reciprocating motion.

A second ejection system of the prior art is shown in FIGS. 2A and 2B. As was the case with FIGS. 1A and 1B, FIGS. 2A and 2B show the ejection system 50 at the two extreme positions of its reciprocating motion.

Many of the components of ejection system 50 are identical to those of ejection system 10. Specifically, ejection system 50 includes a base plate 52, at least two side members 54 on opposite sides of the base plate 52, and a support plate 56, which together define an ejector box 58. Again, side members 54, which may be cylindrical, also support the entire closing tonnage that is applied to the mold. Support plate 56, in practice, contains the actual molding components either recessed thereinto or standing thereabove. As before, at least one ejector pin 60 passes through a hole 57 in the support plate 56 to participate in knocking a molded article from a mold. In addition, there will be at least one extended ejector pin 62 longer than ejector pin 60, and passing through a hole 59 in the support plate 56, to knock-out a runner or a shallow-draw part.

Also as before, ejector pin 60 and extended ejector pin 62 are mounted for reciprocating movement by means of a knock-out pin plate 64 and a knock-out retainer plate 66. Ejector pin 60 and extended ejector pin 62 have heads 68 which enable, in the manner previously described, the pins to be mounted through hole 61, for ejector pin 60, and hole 63, for extended ejector pin 62, in the knock-out pin plate 64, and retained there by knock-out retainer plate 66 in the positions desired. During actual operation, knock-out pin plate 64 and knock-out retainer plate 66 are fixedly secured together by socket head cap screws 65. As before, the base plate 52 may be fitted with return stops 70, against which the knock-out retainer plate 66 may rest at the completion of the knock-out cycle.

As noted above, the extended ejector pin 62 is designed to knock out a runner before the ejector pin 60 ejects the molded article from the mold. As a consequence of the length of the extended ejector pin 62, the molded article may tend to hang thereon. When the knock-out pin plate 64 and knock-out retainer plate 66 reverse their direction of reciprocating motion to retract the ejector pin 60 and extended ejector pin 62, the molded article may be drawn back into the mold cavity by the extended ejector pin 62. A second knock-out stroke of ejector pin 60 and extended ejector pin 62 is sometimes used to dislodge any molded article hung up in this fashion to prevent the mold from closing onto such an article. A second knock-out stroke will naturally require additional cycle time.

Figure 3A:
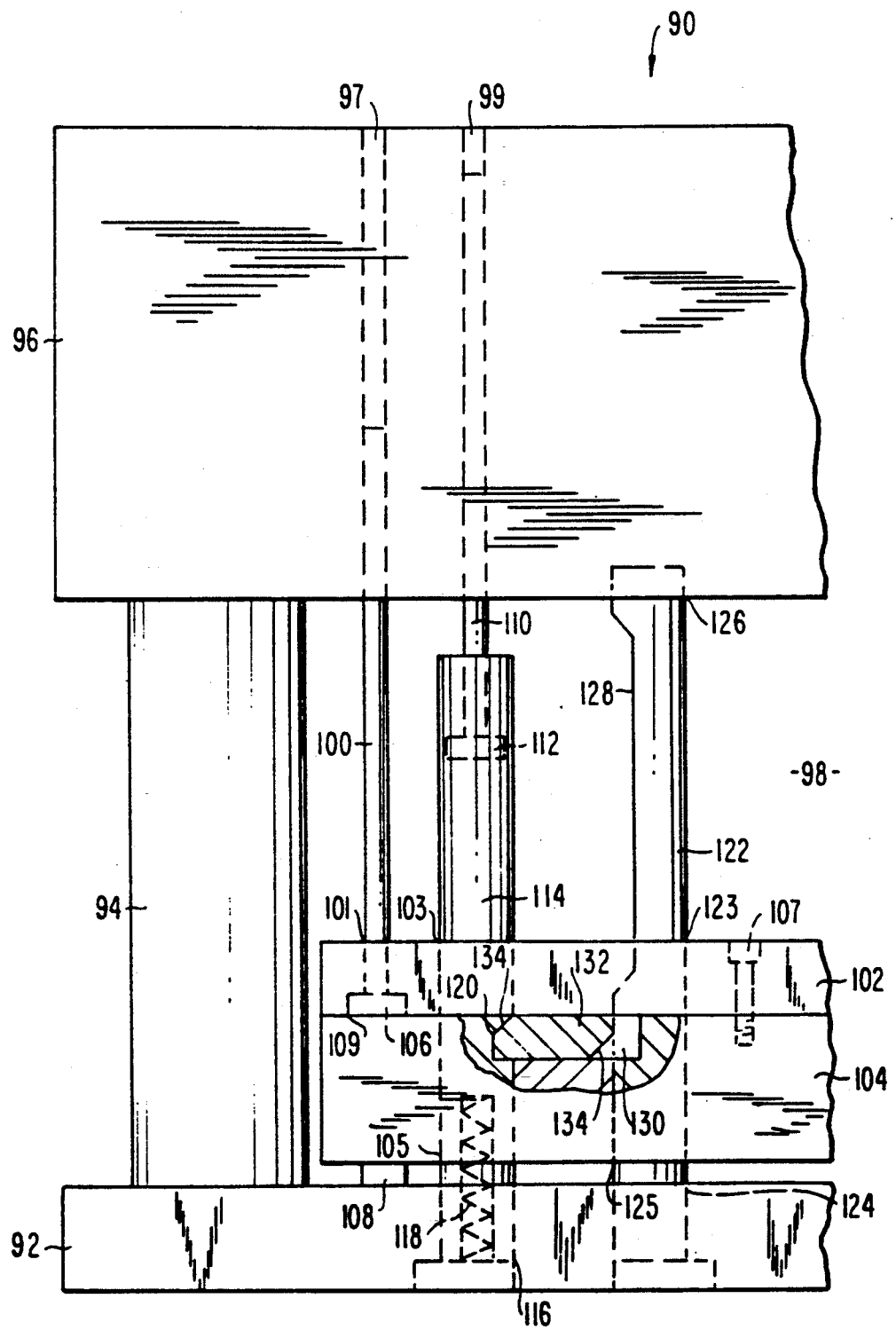
FIG. 3A presents a side view in partial cross section of the independent-stroke ejection system of the present invention at an extreme position in its reciprocating motion.
Figure 3B:
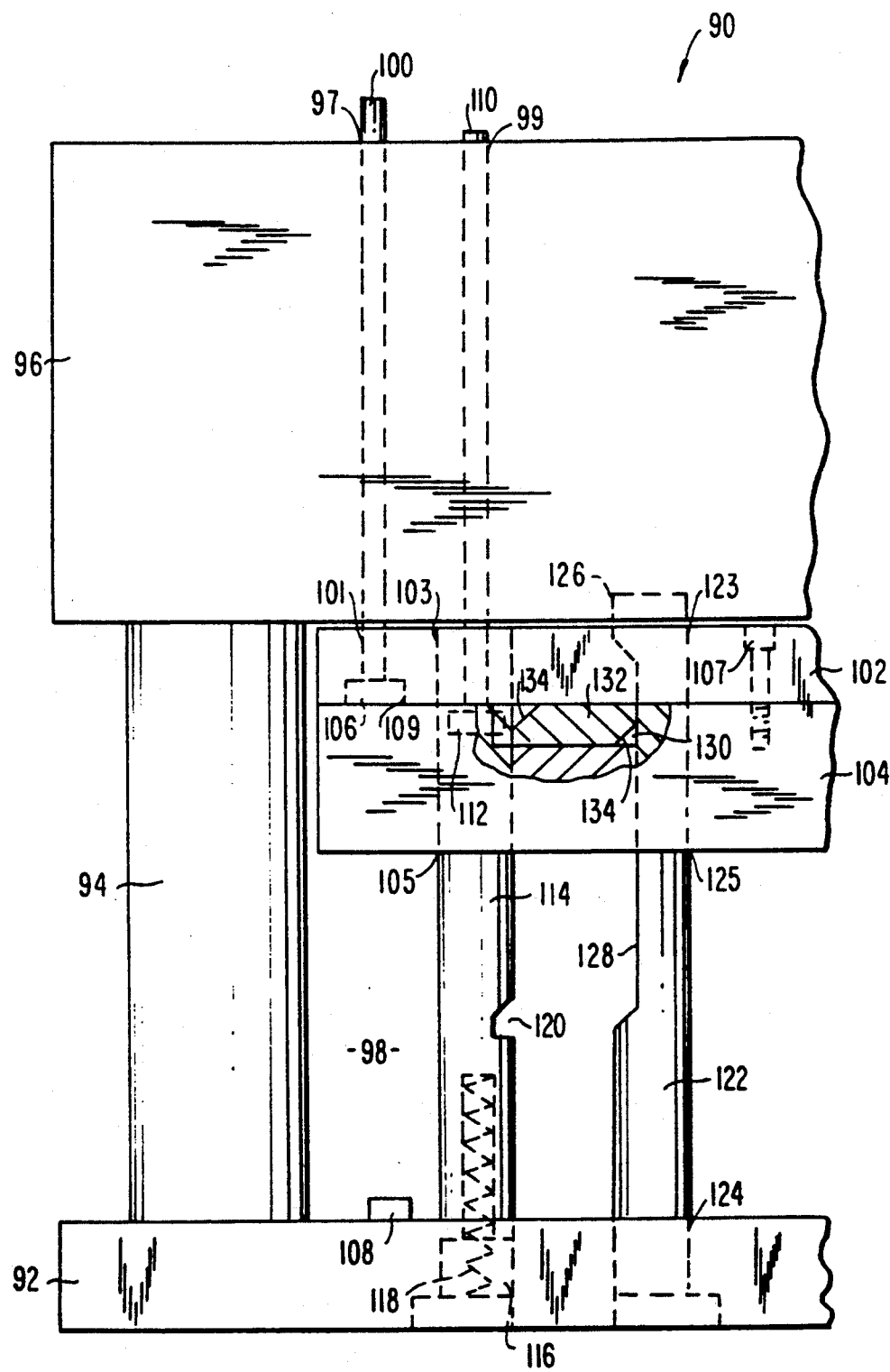
FIG. 3B presents the same view of the independent-stroke rejection system of the present invention shown in FIG. 3A at the other extreme position in its reciprocating motion.

The independent-stroke ejection system 90 of the present invention is shown in FIGS. 3A and 3B at the two extreme positions of its reciprocating motion.

It will be observed at the outset that the independent-stroke ejection system 90 has elements in common with the two prior-art systems already described. Specifically, the system 90 includes a base plate 92, at least two side members 94 on opposite sides of base plate 92, and a support plate 96, which together define an ejector box 98. Again, side members 94, which may be cylindrical, also support the entire closing tonnage that is applied to the mold. The support plate 96 is so identified because it supports one portion of a mold, as previously mentioned, used to manufacture a molded article by injection molding. Support plate 96, in practice, contains the actual molding components either recessed thereinto or standing thereabove. At least one ejector pin 100 passes through the support plate 96 in hole 97 provided therethrough to participate in knocking a molded article from the mold.

As before, the ejector pin 100 is mounted for reciprocating movement by means of a knock-out pin plate 102 and a knock-out retainer plate 104. Also as before, the ejector pin 100 has a head 106 which prevents the ejector pin 100 from slipping from its desired position. Ejector pin 100 passes through hole 101 in knock-out pin plate 102. Hole 101 has a portion 109 of enlarged diameter to accommodate head 106. During actual operation, the knock-out pin plate 102 and the knock-out retainer plate 104 are fixedly secured together by socket head cap screws 107.

During the operation of the independent-stroke ejection system 90, the knock-out pin plate 102 and the knock-out retainer plate 104 reciprocate within ejector box 98, up and down as depicted in FIGS. 3A and 3B, as a unit, thereby advancing and retracting the ejector pin 100. The base plate 92 may be fitted with return stops 108, against which the knock-out retainer plate 104 may rest at the completion of the knock-out cycle.

As implied by the name given to the present invention by its inventors, the independent-stroke ejection system, includes at least one ejector pin whose motion is independent of that of the knock-out pin plate 102 and knock-out retainer plate 104. That is to say, while the motion of ejector pin 100 depends on the motion of the knock-out pin plate 102 and of the knock-out retainer plate 104, and reciprocates back and forth over an equivalent distance, the present invention provides a means for varying the stroke of an ejector pin, so that such a pin may be started and stopped independently of the plate motion, and may as a consequence travel only for a portion of the distance covered by said plates, doing so at a speed equivalent to that of the other pins.

According to the present invention, and with reference to FIG. 3A, an independent-stroke ejector pin 110 is directed through hole 99 in support plate 96. Independent-stroke ejector pin 110 has a head 112, by which it is held within the upper end of an independent-stroke knock-out pin retainer rod 114.

Independent-stroke knock-out pin retainer rod 114 may be further characterized as follows. Firstly, independent-stroke knock-out pin retainer rod 114 extends toward the support plate 96 from a recess 116 in the base plate 92. Secondly, independent-stroke knock-out pin retainer rod 114 is longer than the distance separating the support plate 96 and the base plate 92. Thirdly, independent-stroke knock-out pin retainer rod 114 is biased toward support plate 96 by spring biasing means 118 acting upon the lower end thereof, which is movably disposed within the recess 116. When spring biasing means 118 have acted upon independent-stroke knock-out pin retainer rod 114 to the maximum possible extent, wherein the upper end thereof abuts the lower surface of support plate 96, a portion of the lower end of said independent-stroke knock-out pin retainer rod 114 remains within recess 116, because the length thereof is greater than the distance separating the support plate 96 and the base plate 92.

Fourthly, the independent-stroke knock-out pin retainer rod 114 extends through holes 103, 105 through the knock-out pin plate 102 and the knock-out retainer plate 104, respectively. Holes 103, 105 are sufficiently large to permit the common reciprocating motion of knock-out pin plate 102 and knock-out retainer plate 104 to proceed freely without binding against independent-stroke knock-out pin retainer rod 114.

Finally there is provided a notch 120 in the side of independent-stroke knock-out pin retainer rod 114. The function of notch 120 will be described below following the presentation of several other elements of the present invention.

The present independent-stroke ejection system 90 also includes a cam rod 122, which also extends from the base plate 92 to the support plate 96. Cam rod 122 is longer than the distance separating the base plate 92 and the support plate 96 and has ends which fit into recesses 124,126 in the base plate 92 and the support plate 96, respectively, firmly holding cam rod 122 in a fixed position. Cam rod 122 further has a travel slot 128 extending along a portion of the side thereof. The travel slot 128 has a depth equal to that of the notch 120 in the independent-stroke knock-out pin retainer rod 114. Cam rod 122 is parallel to independent-stroke knock-out pin retainer rod 114; further, the travel slot 128 on the cam rod 122 faces notch 120 on the independent-stroke knock-out pin retainer rod 114. Finally, the cam rod 122 extends through holes 123, 125 through the knock-out pin plate 102 and the knock-out retainer plate 104, respectively. Holes 123, 125 are sufficiently large to permit the common reciprocating motion of knock-out pin plate 102 and the knock-out retainer plate 104 to proceed freely without binding against independent-stroke knock-out pin retainer rod 114.

Knock-out retainer plate 104, as may be observed in FIGS. 3A and 3B, is provided with a rectangular channel 130, which extends between holes 105 and 125. As the travel slot 128 and the notch 120 face each other, channel 130 will communicate with each at some point in the common reciprocating motion of knock-out pin plate 102 and knock-out retainer plate 104. Channel 130 becomes a closed compartment when knock-out pin plate 102 is fixedly secured to knock-out retainer plate 104.

Channel 130 houses a cam 132, which is laterally translatable therewithin. Cam 132 has the shape of a rectangular parallelepiped of somewhat shorter length than that of channel 130, so as to be laterally translatable therewithin. More specifically, the length of cam 132 is substantially equal to the distance separating hole 105 and hole 125 in knock-out retainer plate 104 plus a distance equal to the depth of the notch 120. As has been previously noted, the depth of the notch 120 is the same as that of the travel slot 128. More specifically yet, the length of cam 132 must be slightly less than this amount in order to avoid the possible binding of the elements of the independent-stroke ejection system 90 of the present invention during operation.

With reference now to FIG. 3A, cam 132 may be observed to have chamfers 134 on two diagonally opposed edges, one being at each end thereof. The chamfer 134 at the end of cam 132 adjacent to the independent-stroke knock-out pin retainer rod 114 is on the upper edge, and faces a correspondingly chamfered portion of notch 120. The chamfer 134 at the end of cam 132 adjacent to cam rod 122 is on the lower edge, and faces a correspondingly chamfered portion of the travel slot 128.

The operation of the independent-stroke ejection system 90 of the present invention may now be understood. FIG. 3A shows independent stroke ejection system 90 at the lowest point in its reciprocating motion. At this point, the independent-stroke knock-out pin retainer rod 114 is separated from the bottom of the support plate 96 by the greatest possible amount, equal to the total amount of the independent-stroke ejection pin 110 may advance. Cam 132 is at this lowest point locked into notch 120. As a consequence, the common upward motion of knock-out pin plate 102 and knock-out retainer plate 104 raises independent-stroke knock-out pin retainer rod 114 and independent-stroke ejector pin 110, as well as ejector pin 100. When the top of independent-stroke knock-out pin retainer rod 114 comes into contact with the bottom of support plate 96, the independent-stroke ejector pin 110 can no longer advance. At this point, notch 120 acts on chamfer 134 to slide cam 132 into travel slot 128 of cam rod 122. The travel slot 128 of cam rod 122 must begin at precisely the point where notch 120 first begins to force cam 132 toward cam rod 122. When the cam 132 is completely forced into the travel slot 128, the knock-out pin plate 102 and knock-out retainer plate 104 continue to ascend together toward the position shown in FIG. 3B, further advancing ejector pin, or pins, 100, while independent-stroke ejector pin 110 is at a standstill.

As knock-out pin plate 102 and knock-out retainer plate 104 begin to descend together from the position shown in FIG. 3B to retract ejector pin 100, spring biasing means 118 keep independent-stroke knock-out pin retainer rod 114 and independent-stroke ejector pin 110 fully advanced, until cam 132 reaches the bottom of travel slot 128 in cam rod 122. When chamfer 134 of cam 132 adjacent to cam rod 122 reaches the bottom of the travel slot 128, the correspondingly chamfered portion of the travel slot 128 will force the cam 132 back into notch 120, locking the independent-stroke knock-out pin retainer rod 114 to the knock-out pin plate 102 and knock-out retainer plate 104, thereby retracting the independent-stroke ejector pin 110, and eventually bringing the system back into the configuration shown in FIG. 3A.

The independent-stroke ejector pin 110 may be attached to the independent-stroke knock-out pin retainer rod 114 by a number of different methods. Two typical methods are illustrated in FIGS. 4 and 5.

Figure 4:
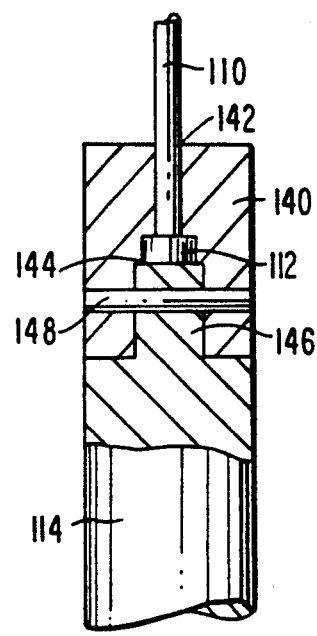
FIG. 4 illustrates one means by which an independent-stroke ejector pin may be attached to an independent-stroke knock-out pin retainer rod.

Referring first to FIG. 4, where an independent-stroke ejector pin 110 and a independent-stroke knock-out pin retainer rod 114 are shown together in cross section, a retainer cap 140 having a diameter equal to that of the independent-stroke knock-out pin retainer rod 114 is provided with a hole 142 through which independent-stroke ejector pin 110 may be directed. Hole 142 has a portion 144 of enlarged diameter to accommodate head 112 on the inside of the retainer cap 140.

Retainer cap 140 fits over a projection 146 on the end of the independent-stroke knock-out pin retainer rod 114. By directing a roll pin 148 diametrically through retainer cap 140 and projection 146, the independent-stroke ejector pin 110 may be firmly, but removably, attached to the independent-stroke knock-out pin retainer rod 114.

Figure 5:
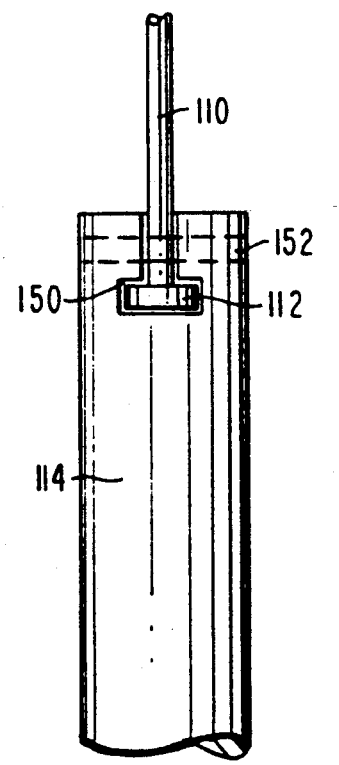
FIG. 5 shows an alternative means for attaching an independent-stroke ejector pin to an independent-stroke knock-out pin retainer rod.

Another method is shown in FIG. 5. As illustrated there, the end of the independent-stroke knock-out pin retainer rod 114 is provided with a "T" slot 150. The head 112 of independent-stroke ejector pin 110 may be slid into the "T" slot 150, and retained therein by roll pin 152, which passes across the opening of "T" slot 150 with a clearance sufficient to retain the independent-stroke ejector pin 110 firmly, but removably, therein.

In an alternate embodiment of the present invention, shown in FIGS. 6A and 6B, an independent-stroke ejector pin 160 may be started, stopped, and subsequently restarted in the same direction during each half of a knock-out cycle.

Figure 6A:
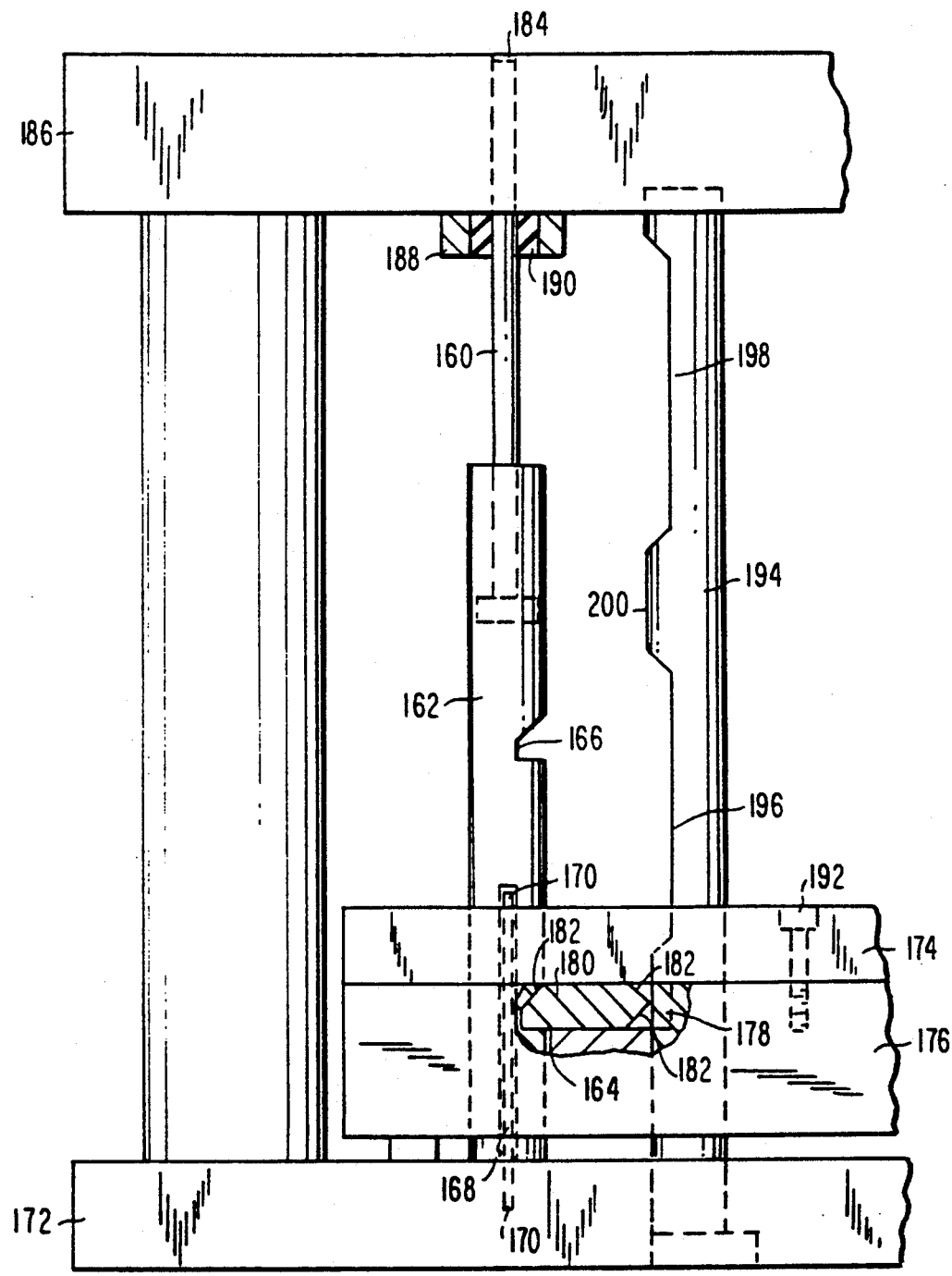
FIG. 6A presents an alternate embodiment of the present invention in its rest position at the beginning of a knock-out cycle.

Turning first to FIG. 6A, which shows this alternate embodiment in its rest position at the beginning of a knock-out cycle, it will first be observed, in contrast with the embodiment shown in FIGS. 3A and 3B, that independent-stroke knock-out pin retainer rod 162 has a first notch 164 and a second notch 166, whose function will be discussed in the paragraphs to follow.

Secondly, independent-stroke knock-out pin retainer rod 162 is provided with an axial bore 168 by which it may be disposed upon an internal guide pin 170, which projects from base plate 172. Internal guide pin 170 provides an alternative to the requirement of a recess in the base plate for positioning the lower end of the independent-stroke knock-out pin retainer rod.

Thirdly, as before, the alternate embodiment shown in FIG. 6A includes a knock-out pin plate 174 and knock-out retainer plate 176, the latter of which is provided again with a rectangular channel 178 for a cam 180. In contrast to the embodiment shown in FIG. 3A, cam 180 has three chamfers 182, whose function will be noted below.

Fourthly, and again as before, independent-stroke ejector pin 160 passes through a hole 184 in support plate 186, so that it may knock a molded article from a mold. On the underside of support plate 186 is mounted a holder 188 which houses a tensioning device 190. Holder 188 includes means for tightening the tensioning device 190 to inhibit the motion of independent-stroke ejector pin 160 within hole 184 through support plate 186. In this manner, the independent-stroke ejector pin 160 and the independent-stroke knock-out pin retainer rod 162 will together remain stationary when unlocked from the knock-out pin plate 174 and the knock-out retainer plate 176, which are joined together by such means as socket head cap screw 192. Tensioning device 190 may be fashioned from such materials as rubber or plastic to provide the necessary amount of friction to retain the independent-stroke ejector pin 160 in a fixed position when required.

Finally, the embodiment shown in FIG. 6A includes a cam rod 194, which has a first travel slot 196 and a second travel slot 198, separated by what may be referred to as intermediate section 200.

Now, as stated previously, FIG. 6A shows this alternate embodiment of the present invention at the beginning of a knock-out cycle. As the cycle begins, the independent-stroke ejector pin 160 and the independent-stroke knock-out pin retainer rod 162 are locked to the combined knock-out pin plate 174 and knock-out retainer plate 176 by means of cam 180. Knock-out pin plate 174 and knock-out retainer plate 176 thus move the independent-stroke ejector pin 160 against the functional resistance provided by tensioning element 190. With specific reference to FIG. 6A, this functional resistance will cause cam 180 to be forced toward the right by first notch 164 in independent-stroke knock-out pin retainer rod 162, when the cam 180 reaches the lower end of first travel slot 196 in cam rod 194. When the cam 180 is forced in this manner from first notch 164, the independent-stroke knock-out pin retainer rod 162 becomes unlocked from the knock-out pin plate 174 and knock-out retainer plate 176, and the independent-stroke ejector pin 160 stops.

Figure 6B:
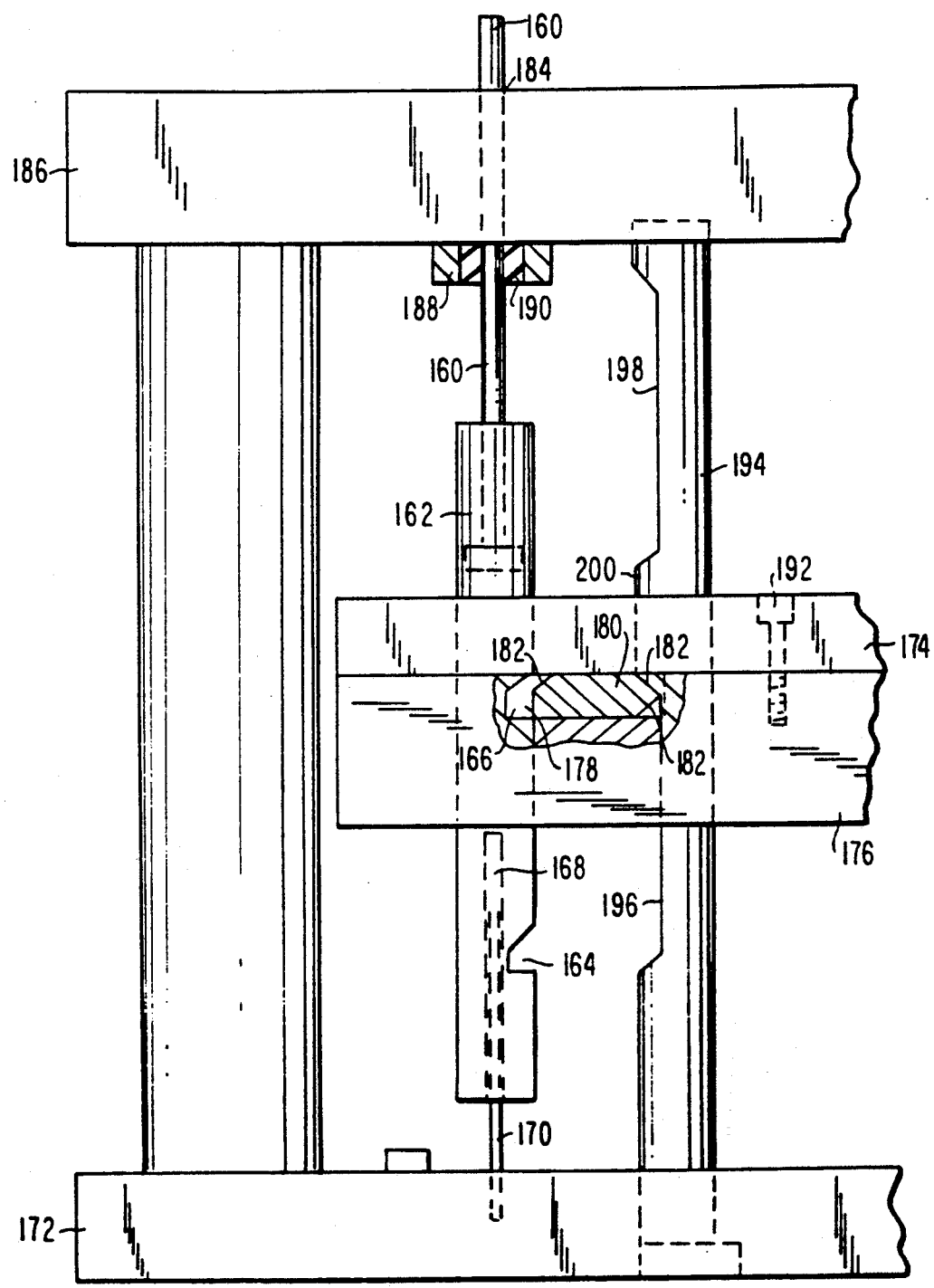
FIG. 6B shows the embodiment of FIG. 6A at an instant during the knock-out cycle.

With reference to FIG. 6B, as the combined knock-out pin plate 174 and knock-out retainer plate 176 continue to move upward in the figure, cam 180 eventually reaches the upper end of first travel slot 196 in cam rod 194. When this occurs, the upper end of first travel slot 196, acting upon chamfer 182, forces cam 180 to the left into second notch 166 to again lock the independent-stroke knock-out pin retainer rod 16 to the knock-out pin plate 174 and knock-out retainer plate 176, and the independent-stroke ejector pin 160 will resume moving upward in the figure.

Second notch 16 in independent-stroke knock-out pin retainer rod 162 and second travel slot 198 in cam rod 194 serve the same purposes as notch 120 and travel slot 128 do in the embodiment shown in FIGS. 3A and 3B. As depicted in FIG. 6B, the knock-out pin plate 174 and knock-out retainer plate 176, moving together as a unit, will move independent-stroke ejector pin 160 and independent-stroke knock-out pin retainer rod 162 upward until, simultaneously, the top of independent-stroke knock-out pin retainer rod 162 reaches holder 188 for the tensioning element 190, and cam 180, having travelled the length of intermediate section 200 of cam rod 194, reaches the lower end of second travel slot 198. At that time, second notch 166 forces cam 180 to the right into second travel slot 198, t hereby unlocking independent-stroke knock-out pin plate 174 and knock-out retainer plate 176, which may continue to move upward to move other ejector pins not shown in FIGS. 6A and 6B.

The second half of the knock-out cycle for the embodiment shown in FIGS. 6A and 6B proceeds by steps taken in the reverse order from those just previously described. As the knock-out pin plate 174 and the knock-out retainer plate 176 begin to descend from their most advanced position, the independent-stroke knock-out pin retainer rod 162, unlocked from them, remains in a stationary position. When cam 180 reaches the lower end of second travel slot 198, cam 180 is forced to the left into second notch 166, and locks the independent-stroke knock-out pin retainer rod 162 to the knock-out pin plate 174 and knock-out retainer plate 176. This allows independent-stroke ejector pin 160 to be withdrawn from the mold until cam 180 reaches the upper end of first travel slot 196. At that point, cam 180 is forced to the right to again unlock independent-stroke knock-out pin retainer rod 162 from knock-out pin plate 174 and knock-out retainer plate 176. This condition is maintained until the cam 180 reaches the lower end of the first travel slot 196, which forces the cam 180 into the first notch 16 to relock independent-stroke knock-out pin retainer rod 162 to knock-out pin plate 17 and knock-out retainer plate 176. In this manner, the system ultimately returns to the configuration shown in FIG. 6A.

In summary, then, the embodiment depicted in FIGS. 6A and 6B permits the independent-stroke ejector pin 160 to be advanced into a mold cavity for a distance, to be stopped, to be advanced further into the mold cavity to the most advanced point desired, and then to be withdrawn therefrom in two steps to a fully retracted position.

Figure 7:
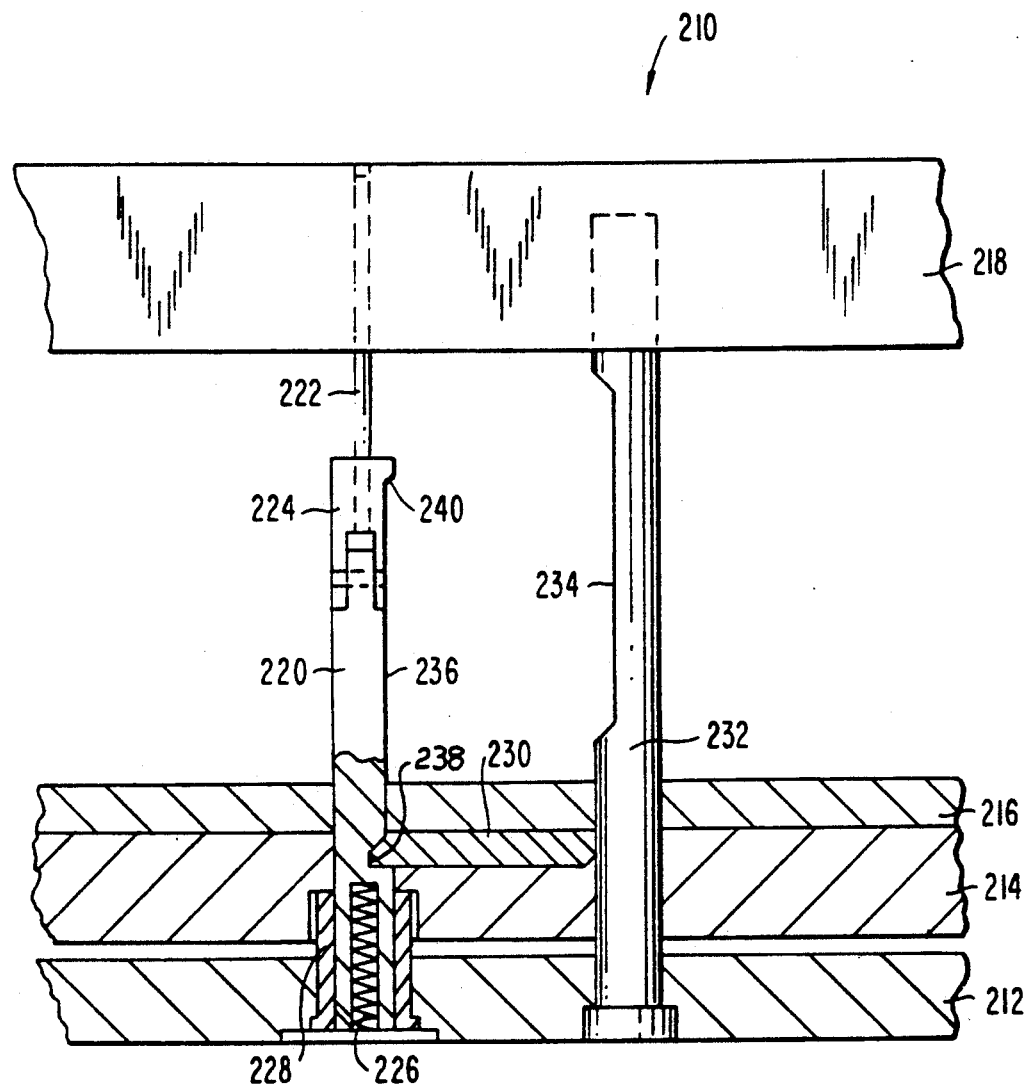
FIG. 7 shows still another embodiment of the present invention.

Turning now to FIG. 7, which shows, in pertinent part, an independent-stroke ejection system of the variety shown earlier in FIGS. 3A and 3B, another means for maintaining an independent-stroke knock-out pin retainer rod in full forward position should the spring biasing means fail is shown. With specific reference to FIG. 7, independent-stroke ejection system 210 again includes a base plate 212, a knock-out retainer plate 214, a knock-out pin plate 216, and a support plate 218. Also included are an independent-stroke knock-out pin retainer rod 220, an independent-stroke ejector pin 222, a retainer cap 224, a spring biasing means 226 at the lower end of the independent-stroke knock-out pin retainer rod 220, an external bushing 228 to guide the lower end of the independent-stroke knock-out pin retainer rod 220, and a cam 230 located, as before, in a channel in the knock-out retainer plate 214, and held therein when the knock-out pin plate 216 is secured to the knock-out retainer plate 214. Cam rod 232 again is provided with a travel slot 234.

In the embodiment shown in FIG. 7, the combined independent-stroke knock-out pin retainer rod 220 and retainer cap 224 is provided with a running groove 236. To provide for the running groove 236, the notch 238 in the independent-stroke knock-out pin retainer rod 220 may be somewhat deeper than that previously shown, and the cam 230 may be somewhat longer. At the end of the independent-stroke knock-out pin retainer rod 220 adjacent to the support plate 218, and specifically in the retainer cap 224, there is a chamfer 240 which matches that of the cam 230.

Independent-stroke ejection system 210 operates in a fashion essentially identical to that previously described for the embodiment shown in FIGS. 3A and 3B. When knock-out retainer plate 214 and knock-out pin plate 216 are together in full forward position, that is, at their closest approach to support plate 218, independent-stroke knock-out pin retainer rod 220 and, it follows, independent-stroke ejector pin 222, are locked in full forward position by the abutment of chamfer 240 in retainer cap 224 against the corresponding chamfer in cam 230. This makes it impossible for the independent-stroke ejector pin 222 to be pushed out of position when the knock-out retainer plate 214 and knock-out pin plate 216 are in full forward position, and is of particular importance when the spring biasing means 226 has for some reason failed and is no longer able to bias the independent-stroke knock-out pin retainer rod 220 toward the support plate 218.

Figure 8:
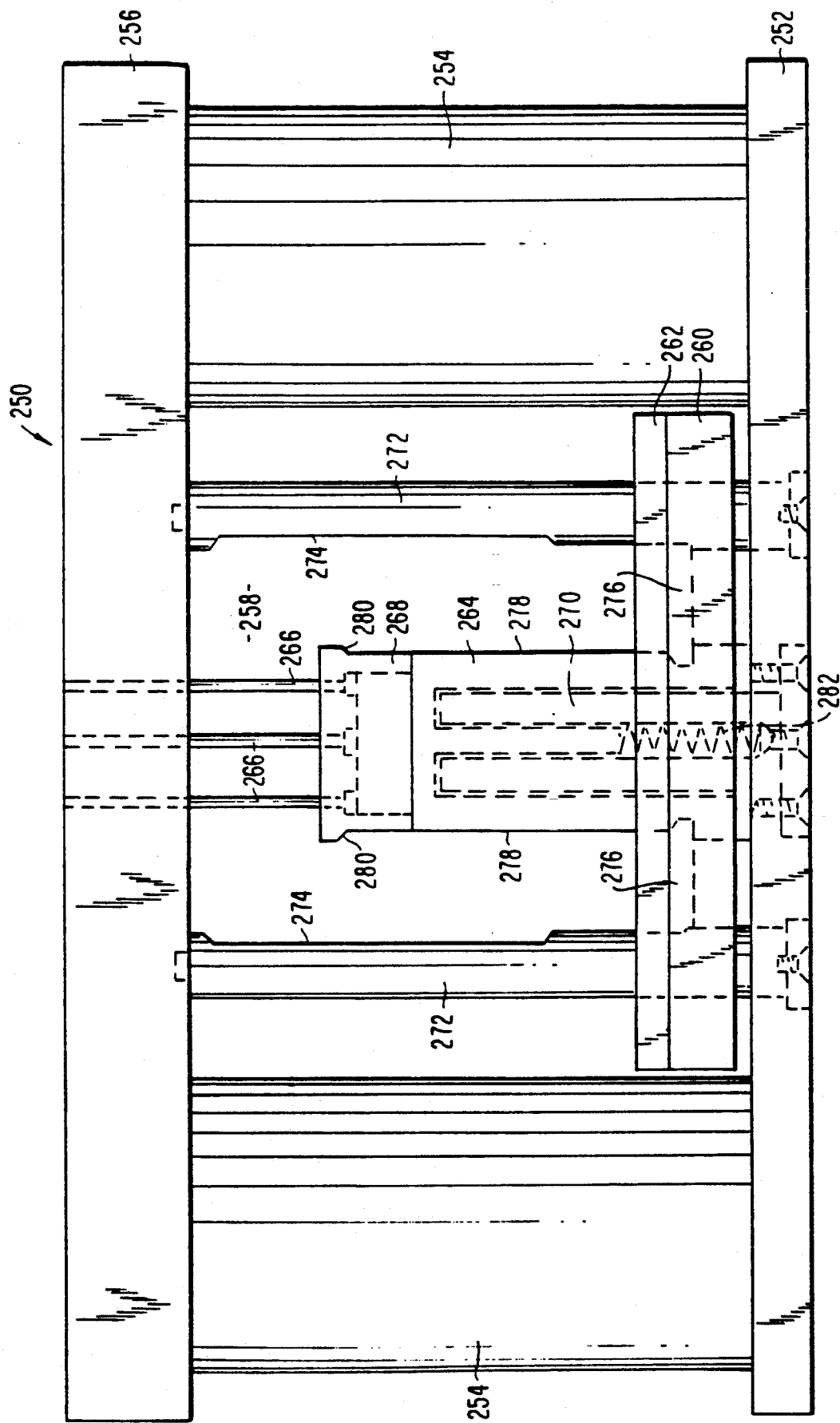
FIG. 8 depicts an embodiment of the present invention wherein a plurality of ejector pins may be mounted on any given independent-stroke knock-out pin retainer rod.

With reference now to FIG. 8, yet another embodiment of the present invention is shown. Independent-stroke ejection system 250 again has elements in common with independent-stroke ejection system 90 of FIGS. 3A and 3B. Specifically, the system 250 includes a base plate 252, at least two side members 254 on opposite sides of base plate 252, and a support plate 256, which together define an ejector box 258. Again, side members 254, which may be cylindrical, also support the entire closing tonnage that is applied to the mold.

In this embodiment, as before, there are included a knock-out retainer plate 260 and a knock-out pin plate 262, which move together as a unit in a fashion identical to that previously described. In this case, however, it will be observed that the independent-stroke knock-out pin retainer rod 264 is broader than those shown earlier so as to accommodate a plurality of independent-stroke ejector pins 266, which are retained, as before, atop independent-stroke knock-out pin retainer rod 264 by retainer cap 268.

Independent-stroke knock-out pin retainer rod 264 is mounted upon an internal guide pin 270, as was the case with the embodiment shown in FIGS. 6A and 6B. Such an internal guide pin 270 may be used instead of an eternal bushing, such as external bushing 228 in FIG. 7, to guide the lower end of the independent-stroke knock-out pin retainer rod 264, but either an internal guide pin or an external bushing may be used. The internal guide pin 270 takes up less space, and is applicable when an independent-stroke knock-out pin retainer rod, such as retainer rod 264, is of large diameter or cross-sectional dimension.

Because of the increased size and independent-stroke ejector pin capacity of independent-stroke knock-out pin retainer rod 264, it is preferred that two cam rods 272, each having a travel slot 274, and two cams 276, each housed in its own channel within knock-out retainer plate 260 on opposite sides of independent-stroke knock-out pin retainer rod 264, be used to control independent-stroke knock-out pin retainer rod 264 and independent-stroke ejector pins 266. In all other respects, independent-stroke ejection system 250 operates in a fashion identical to the previously discussed embodiments of the present invention. It will be noted that the combined independent-stroke knock-out pin retainer rod 264 and retainer cap 268 have running grooves 278 associated with each cam 276. The running grooves 278, and chamfers 280, serve the same function as do those in the embodiment shown in FIG. 7. That is to say, chamfers 280 lock independent-stroke ejector pins 266 in full forward position, when the combined knock-out retainer plate 260 and knock-out pin plate 262 are at their closest approach to support plate 256, thereby acting as a failsafe mechanism to prevent independent-stroke ejector pins 266 from being moved in the event that spring biasing means 282 for some reason fails to operate properly.

In a further embodiment of the present invention, shown in FIG. 9, the independent-stroke knock-out pin retainer rod is replaced with a second combination of a knock-out retainer plate and a knock-out pin plate, so that a mold designer may vary the knock-out stroke for any group, or groups, of ejector pins independent of those of another group, or groups, of ejector pins.

With reference now to FIG. 9, independent-stroke ejection system 300 has elements in common with independent-stroke ejection system 250 of FIG. 8. Specifically, the system 300 includes a base plate 302, at least two side members 304 on opposite sides of base plate 302, and a support plate 306, which together define an ejector box 308.

The embodiment shown in FIG. 9 includes a first knock-out pin plate 310, a first knock-out retainer plate 312, a second knock-out pin plate 314, and a second knock-out retainer plate 316. Although not shown in FIG. 9 for the sake of clarity, first knock-out pin plate 310 and first knock-out retainer plate 312 together may hold a first group, or groups, of ejector pins, which pass up through the support plate 306 to participate in knocking molded articles from a mold. Similarly, second knock-out pin plate 314 and second knock-out retainer plate 316 together may hold a second group, or groups, of ejector pins, which must pass not only up through support plate 306, but also up through first knock-out pin plate 310 and first knock-out retainer plate 312. The ejector pins mounted on first knock-out pin plate 310 and first knock-out retainer plate 312 move independently of those mounted on second knock-out pin plate 314 and second knock-out retainer plate 316 in a manner to be described below.

With reference again to FIG. 9, channels are provided in knock-out retainer plate 312 for cams 318, which, in a manner essentially identical to that previously described for other embodiments of the present invention, ultimately lock first knock-out pin plate 310 and first knock-out retainer plate 312 to second knock-out pin plate 314 and second knock-out retainer plate 316, or unlock these combined plates from one another. The cams 318, as before, are held within their respective channels when knock-out pin plate 310 is secured to knock-out retainer plate 312.

Instead of including a cam rod, the embodiment shown in FIG. 9 has a cam bar 320, which may have a rectangular cross section. Cam bar 320 has travel slots 322, into which cams 318 slide when the combined first knock-out pin plate 310 and first knock-out retainer plate 312 are unlocked from second knock-out pin plate 314 and second knock-out retainer plate 316.

In addition, the embodiment shown in FIG. 9 includes two locking plates 324, which may also be of rectangular cross section, and which extend from the combined second knock-out pin plate 314 and second knock-out retainer plate 316, to which they are fixedly secured, to the combined first knock-out pin plate 310 and first knock-out retainer plate 312. Locking plates 324 have notches 326, into which cams 318 slide when the combined first knock-out pin plate 310 and first knock-out retainer plate 312 are locked to the combined second knock-out pin plate 314 and second knock-out retainer plate 316. In this respect, notches 326 carry out the same function as do the notches in the independent-stroke knock-out pin retainer rods of previously discussed embodiments of the present invention. In fact, one may regard either the combined first knock-out pin plate 310 and first knock-out retainer plate 312 or the combined second knock-out pin plate 314 and second knock-out retainer plate 316 as being analagous to the independent-stroke knock-out pin retainer rods in other embodiments of the present invention, but with the difference being that many more ejector pins may be controlled independently of other ejector pins with the use of the present embodiment.

The embodiment shown in FIG. 9 may be used according to one of two distinct modes of operation. According to the first, power is applied directly to the combined first knock-out pin plate 310 and first knock-out retainer plate 312. Initially, the combined first knock-out pin plate 310 and first knock-out retainer plate 312 pull the combined second knock-out pin plate 314 and second knock-out retainer plate 316 by means of the locking plates 324. As the cams 318 reach the travel slots 322 in the cam bar 320, cams 318 are forced out of the notches 326 and into the travel slots 322, thereby unlocking the combined second knock-out pin plate 314 and second knock-out retainer plate 316 from the combined first knock out pin plate 310 and first knock-out retainer plate 312. The combined first knock-out pin plate 310 and first knock-out retainer plate 312 will continue to move forward alone to their point of closest approach to the support plate 306. In the course of the return stroke from that point, the combined first knock-out pin plate 310 and first knock-out retainer plate 312 will proceed alone until that point where cams 318 are forced back into the notches 326 in the locking plates 324, thereby locking the combined first knock-out pin plate 310 and first knock-out retainer plate 312 and the combined second knock-out pin plate 314 and second knock-out retainer plate 316 together. Thereafter, the independent-stroke ejection system 300 returns to its fully retracted position.

According to the second distinct mode of operation, power is applied directly to the combined second knock-out pin plate 314 and second knock-out retainer plate 316. At the start of the forward stroke, cams 318 are in the locked position, and both the combined first knock-out pin plate 310 and first knock-out retainer plate 312 and the combined second knock-out pin plate 314 and second knock-out retainer plate 316 move forward together. When cams 318 reach the beginning of the travel slots 322 in the cam bar 320, the cams 318 are forced thereinto from the notches 326, thereby unlocking the combined first knock-out pin plate 310 and first knock-out retainer plate 312 from the combined second knock-out pin plate 314 and second knock-out retainer plate 316. At this point, the combined first knock-out pin plate 310 and first knock-out retainer plate 312 will remain stationary, while the combined second knock-out pin plate 314 and second knock-out retainer plate 316 will continue to move forward until they reach the combined first knock-out pin plate 310 and first knock-out retainer plate 312. At that point, the forward stroke may be terminated, or the combined first knock-out pin plate 310 and first knock-out retainer plate 312 and the combined second knock-out pin plate 314 and second knock-out retainer plate 316 may continue to move forward. It should be observed that if they do continue to move forward, the ejector pins mounted on the combined first knock-out pin plate 310 and first knock-out retainer plate 312 will have moved, stopped, and then resumed moving in the same direction during the forward knock-out stroke.

At the start of the return stroke, the combined second knock-out pin plate 314 and second knock-out retainer plate 316 will initially begin to retract, while the combined first knock-out pin plate 310 and first knock-out retainer plate 312 will remain at rest until the cams 318 are forced back into the notches 326, thereby relocking the combined first knock-out pin plate 310 and first knock-out retainer plate 312 to the combined second knock-out pin plate 314 and second knock-out retainer plate 316. Thereafter, both the combined first knock-out pin plate 310 and first knock-out retainer plate 312 and the combined second knock-out pin plate 314 and second knock-out retainer plate 316 return together to their fully retracted positions.

Modifications to the above would be obvious to those skilled in the art, and would not bring the independent-stroke ejection system so modified beyond the scope of appended claims.

What is claimed is:

1. An independent-stroke ejection device for an injection molding apparatus comprising:
   a base plate;
   a support plate, said support plate being substantially parallel to said base plate and separated therefrom by a fixed distance, said support plate further having a plurality of holes penetrating therethrough, said support plate being associated with a portion of a mold in said injection molding apparatus;
   at least two side members, said side members being connected to said base plate and to said support plate, separating said base plate and said support plate by said fixed distance, and defining therewith an ejector box;

a first knock-out pin plate, said first knock-out pin plate being within said ejector box and substantially parallel to said support plate, said first knock-out pin plate further having a first hole, a second hole, at least one third hole, said third hole having a portion of enlarged diameter adjacent to a surface of said first knock-out pin plate facing away from said support plate;

a first knock-out retainer plate, said first knock-out retainer plate being within said ejector box between said first knock-out pin plate and said base plate, said first knock-out retainer plate further being fixedly securable to said first knock-out pin plate and together therewith being reciprocable within said ejector box between a first extreme position and a second extreme position adjacent to said support plate and said base plate respectively, said first knock-out retainer plate having a first hole and a second hole, said first hole and said second hole of said first knock-out retainer plate communicating with said first hole and said second hole of said first knock-out pin plate, respectively, when said first knock-out pin plate and said first knock-out retainer plate are fixedly secured together, said first hole and said second hole of said first knock-out retainer plate being connected by a channel in a surface of said first knock-out retainer plate facing said first knock-out pin plate, said channel thereby having a length equal to the distance between said first hole and said second hole, so that a compartment communicating between said first hole and said second hole is formed from said channel when said first knock-out pin plate and said first knock-out retainer plate are fixedly secured together;

means for fixedly securing said first knock-out pin plate to said first knock-out retainer plate;

means for reciprocating said first knock-out pin plate and said first knock-out retainer plate together within said ejector box between said first and second extreme positions;

an elongated locking member, said elongated locking member extending through said first hole of said first knock-out retainer plate and said first hole of said first knock-out pin plate in a direction from said base plate toward said support plate, said elongated locking member having a first notch on a side thereof, said first notch being communicable with said channel in said first knock-out retainer plate, said first notch further having a depth and a chamfered wall on a side thereof facing said base plate;

at least one ejector pin, said ejector pin having a head of enlarged diameter, said ejector pin being inserted through said at least one third hole in said first knock-out pin plate toward said support plate, said head of said ejector pin being held within said portion of enlarged diameter of said at least one third hole in said first knock-out pin plate, so that said ejector pin may be held by said first knock-out pin plate when said first knock-out pin plate and said first knock-out retainer plate are fixedly secured together, said ejector pin further extending from said first knock-out pin plate and into one of said plurality of holes in said support plate to eject a molded article produced by said injection molding apparatus;

an independent-stroke ejector pin, said independent-stroke ejector pin being operatively connected to said elongated locking member, said independent-stroke ejector pin further extending into one of said plurality of holes in said support plate to eject a runner associated with a molded article produced by said injection molding apparatus, said independent-stroke ejector pin also having a head of enlarged diameter;

means operatively connecting said independent-stroke ejector pin to said elongated locking member, said operatively connecting means including a hole having a portion of enlarged diameter to accommodate said head of said independent-stroke ejector pin, so that said independent-stroke ejector pin may be held by said operatively connecting means;

means for attaching said head of said independent-stroke ejector pin to said operatively connecting means;

a cam member, said cam member being rigidly attached to said base plate and to said support plate, said cam member extending from said base plate through said second hole of said first knock-out retainer plate and said second hole of said first knock-out pin plate to said support plate, said cam member having a first travel slot extending along a side thereof, said first travel slot being communicable with said channel in said first knock-out retainer plate, said first travel slot having a depth substantially equal to that of said first notch in said elongated locking member, said first travel slot having a chamfered end facing away from said base plate; and a cam, said cam being disposed within said compartment formed by said channel in said first knock-out retainer plate and said first knock-out pin plate and being laterally translatable therewithin, said cam having a length substantially equal to the length of said channel plus the depth of said first notch, said cam having a first and a second chamfered end corresponding to said chamfered wall of said first notch in said elongated locking member and said chamfered end of said first travel slot of said cam member, respectively, so that said cam may alternately be laterally translated into said first travel slot of said cam member by said chamfered wall of said first notch to unlock said elongated locking member from said first knock-out pin plate and said first knock-out retainer plate, and laterally translated back into said first notch by said chamfered end of said first travel slot to lock said elongated locking member to said first knock-out pin plate and said first knock-out retainer plate during each cycle of the reciprocating motion of said first knock-out pin plate and said first knock-out retainer plate together within said ejector box.

2. An independent-stroke ejection device as claimed in claim 1, wherein said means operatively connecting said independent-stroke ejector pin to said elongated locking member comprises a retainer cap, said retainer cap being attachable to said elongated locking member and having a hole passing therethrough, said hole having a portion of enlarged diameter within said retainer cap to accommodate said head of said independent-stroke ejector pin, so that said independent-stroke ejector pin is affixed upon said elongated locking member by directing said independent-stroke ejector pin through said hole so as to dispose said head of said independent-stroke ejector pin within said portion of enlarged diameter of said hole, and then by attaching said retainer cap to said elongated locking member.

3. An independent-stroke ejection device as claimed in claim 1, wherein said means operatively connecting said independent-stroke ejector pin to said elongated locking member comprises a retainer cap, said retainer cap being attachable to said elongated locking member and having a plurality of holes passing therethrough, each of said holes having a portion of enlarged diameter within said retainer cap to accommodate said head of said independent-stroke ejector pin, so that said independent-stroke ejector pin is affixed upon said elongated locking member by directing said independent-stroke ejector pin through one of said plurality of holes so as to dispose said head of said independent-stroke ejector pin within said portion of enlarged diameter of said hole, and then by attaching said retainer cap to said elongated locking member, and further so that a plurality of independent-stroke ejector pins as large in number as said plurality of holes in said retainer cap is disposed on said elongated locking member.

4. An independent-stroke ejection device as claimed in claim 1, wherein said first knock-out pin plate further comprises at least one fourth hole, and said first knock-out retainer plate further comprises at least one third hole, said at least one fourth hole of said first knock-out pin plate communicating with said at least one third hole of said first knock-out retainer plate, and wherein said means operatively connecting said independent-stroke ejector pin to said elongated locking member comprises:

a second knock-out pin plate, said second knock-out pin plate being within said ejector box and substantially parallel to said support plate, and between said first knock-out retainer plate and said base plate, said second knock-out pin plate further having a first hole, a second hole, and at least one third hole, said third hole having a portion of enlarged diameter adjacent to a surface of said second knock-out pin plate facing away from said support plate;

a second knock-out retainer plate, said second knock-out retainer plate being within said ejector box between said second knock-out pin plate and said base plate, said second knock-out retainer plate further being fixedly securable to said second knock-out pin plate and together therewith being reciprocable within said ejector box between a first extreme position and a second extreme position adjacent to said support plate and said base plate respectively, said second knock-out retainer plate having a first hole and a second hole, said first hole and said second hole of said second knock-out retainer plate communicating with said first hole and said second hole of said second knock-out pin plate, respectively, when said second knock-out pin plate and said second knock-out retainer plate are fixedly secured together; and means for fixedly securing said second knock-out pin plate to said second knock-out retainer plate, wherein said elongated locking member is fixed within said first hole of said second knock-out retainer plate, and passes through said first hole of said second knock-out pin plate, wherein said cam member passes through said second hole of said second knock-out retainer plate and said second hole of said second knock-out pin plate, and wherein said independent-stroke ejector pin is inserted through said at least one third hole in said second knock-out pin plate toward said support plate, said head of said independent-stroke ejector pin being held within said portion of enlarged diameter of said at least one third hole in said second knock-out pin plate, so that said independent-stroke ejector pin may be held by said second knock-out pin plate when said second knock-out pin plate and said second knock-out retainer plate are fixedly secured together, said independent-stroke ejector pin further extending from said second knock-out pin plate, through said at least one third hole in said first knock-out retainer plate and through said at least one fourth hole in said first knock-out pin plate, and into one of said plurality of holes in said support plate to eject a molded article produced by said injection molding apparatus.

* * * * *